(12) United States Patent
Yanagawa et al.

(10) Patent No.: US 8,072,989 B2
(45) Date of Patent: Dec. 6, 2011

(54) VIRTUAL VOLUME TRANSFER APPARATUS, VIRTUAL VOLUME TRANSFER METHOD, AND COMPUTER PRODUCT

(75) Inventors: Toshihide Yanagawa, Kawasaki (JP); Hiroshi Yazawa, Kawasaki (JP); Akira Nakada, Kanazawa (JP); Eiji Hamamoto, Kanazawa (JP); Masaru Shibata, Kawasaki (JP); Himiko Kaneko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1111 days.

(21) Appl. No.: 11/807,600

(22) Filed: May 29, 2007

(65) Prior Publication Data

US 2007/0280272 A1 Dec. 6, 2007

Related U.S. Application Data

(63) Continuation of application No. PCT/JP2004/017731, filed on Nov. 29, 2004.

(51) Int. Cl.
*H04L 12/28* (2006.01)
(52) U.S. Cl. ............... 370/400; 711/112; 711/162
(58) Field of Classification Search .......... 370/400; 711/112, 162, 161, 165, 170, 202; 719/325
See application file for complete search history.

(56) References Cited

U.S. PATENT DOCUMENTS

| | | | |
|---|---|---|---|
| 2003/0188085 A1 | 10/2003 | Arakawa et al. | |
| 2003/0191904 A1* | 10/2003 | Iwami et al. | 711/147 |
| 2003/0221063 A1 | 11/2003 | Eguchi et al. | |
| 2004/0254964 A1* | 12/2004 | Kodama et al. | 707/204 |
| 2005/0060506 A1* | 3/2005 | Higaki et al. | 711/162 |
| 2005/0120172 A1* | 6/2005 | Ozaki et al. | 711/114 |
| 2005/0125609 A1* | 6/2005 | Satoyama et al. | 711/114 |
| 2005/0256898 A1* | 11/2005 | Akagawa et al. | 707/102 |
| 2005/0267986 A1* | 12/2005 | Murakami et al. | 709/238 |

FOREIGN PATENT DOCUMENTS

| | | |
|---|---|---|
| JP | 05-173873 | 7/1993 |
| JP | 2000-10738 | 1/2000 |
| JP | 2002-297455 | 10/2002 |
| JP | 2003-108420 | 4/2003 |
| JP | 2003-150414 | 5/2003 |
| JP | 2003-296039 | 10/2003 |
| JP | 2003-296152 | 10/2003 |
| JP | 2003-345522 | 12/2003 |
| JP | 2004-145855 | 5/2004 |

OTHER PUBLICATIONS

"Primecluster GDS4.X" URL:http//primeserver.fujitsu.com/primepower/products/soft/opt/pcl_gds_4x, May 25, 2007.
Okita, Eiji, "Integrated Management by SystemWalker Having Virtual Storage Product Incorporated Therein," Computopia vol. 37, No. 430, Kabushiki Kaisha Konputa Ejisha, Jul. 1, 2002, pp. 80-81.
Mogi, Ryuta, "Storage no Kasoka de SAN no Kino Kyoka to Ikkatsu Kanri o Jitsugen," Nikkei Windows Pro No. 65, Nikkei Business Publications, Inc., Aug. 1, 2002, pp. 13-15.
Japanese Office Action dated Jun. 29, 2010 for Japanese Application No. 2006-546519 filed May 27, 2002.

\* cited by examiner

*Primary Examiner* — Jung Park

(57) ABSTRACT

A method of transferring a virtual volume established on a real volume includes acquiring transfer source virtual volume information from a transfer source, acquiring transfer destination real volume information from a transfer destination, generating transfer destination virtual volume information from the transfer source virtual volume information by using the transfer destination real volume information, and establishing a virtual volume at the transfer destination based on the transfer destination virtual volume information.

12 Claims, 13 Drawing Sheets

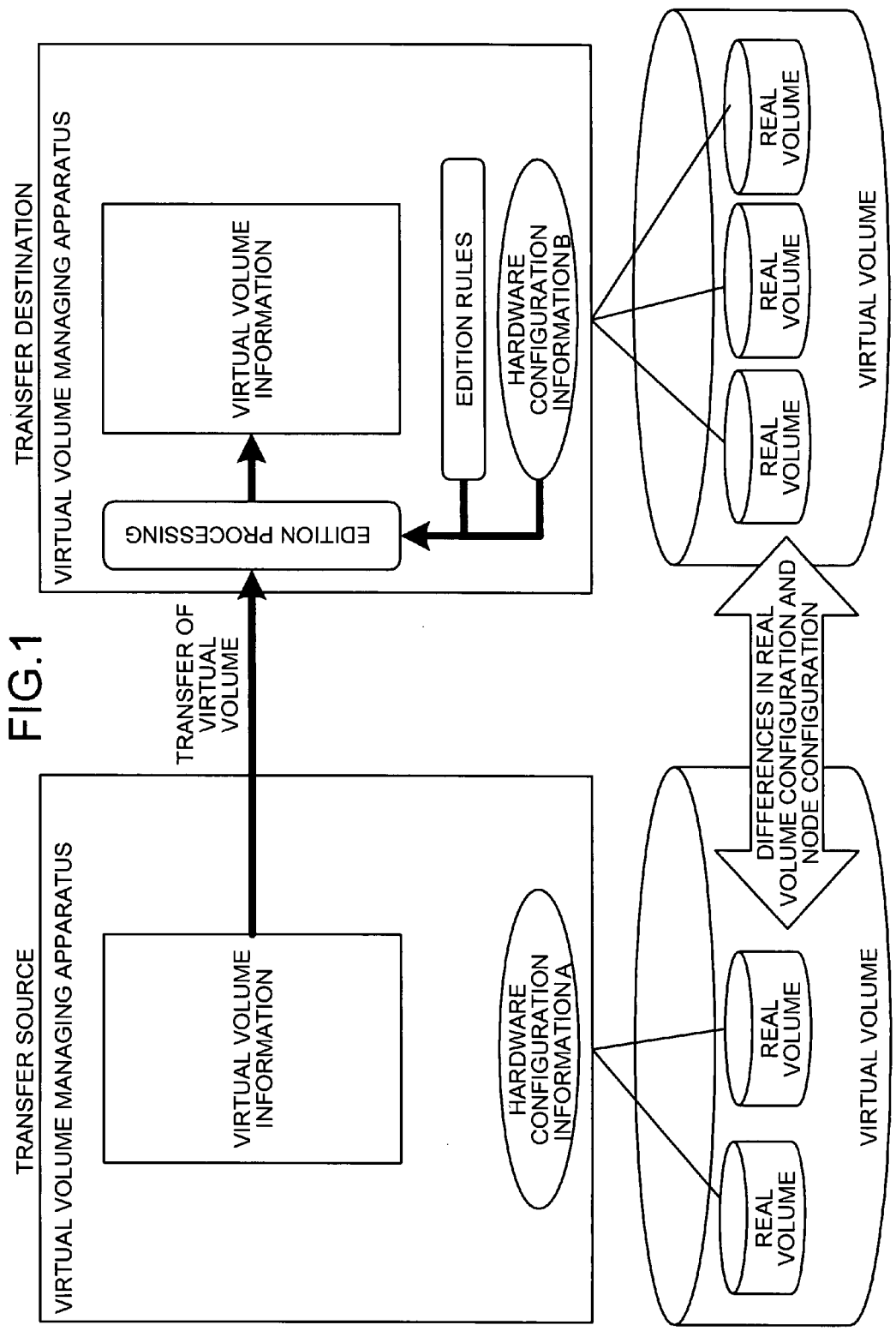

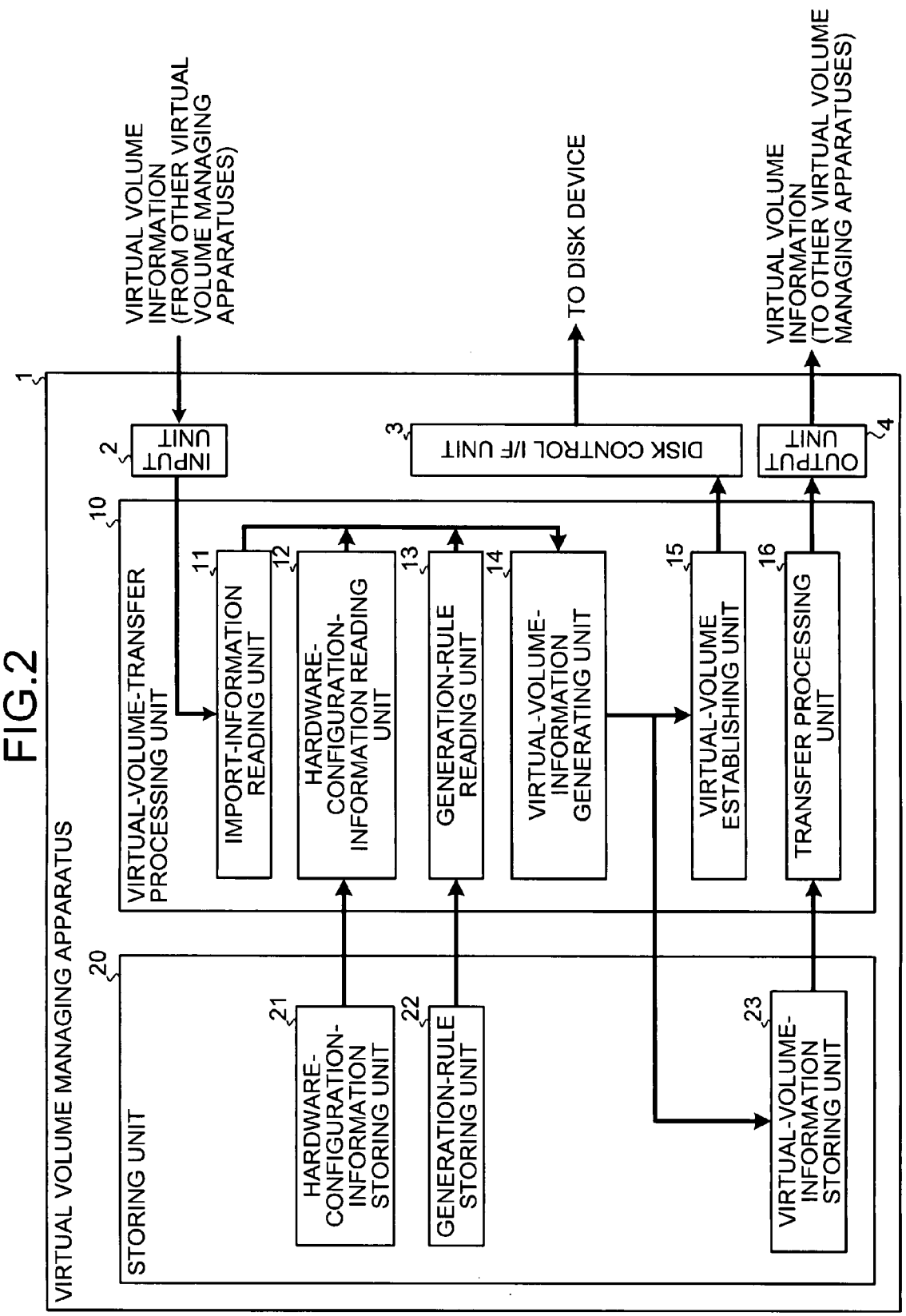

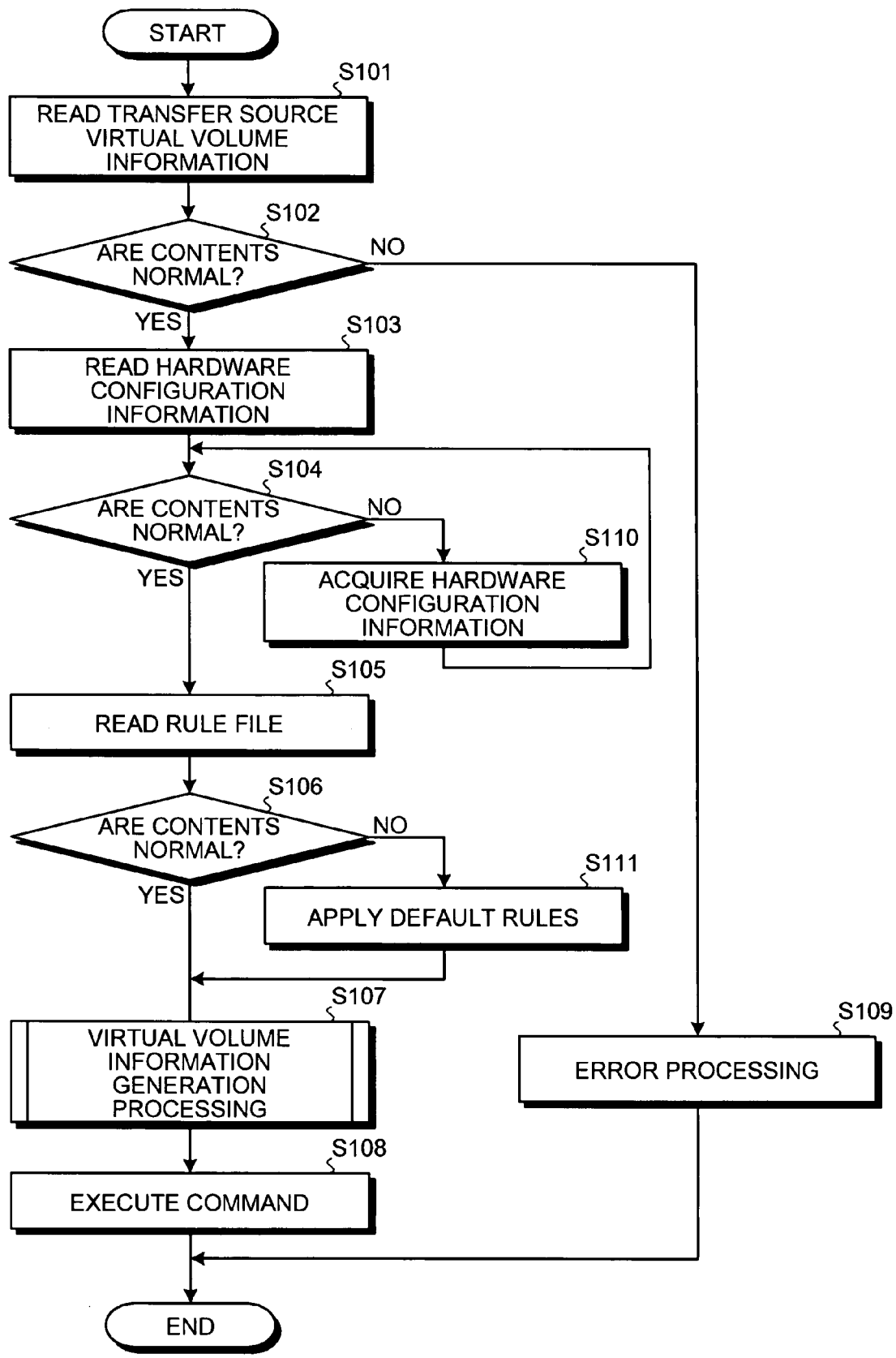

FIG.4

| | OBJ | NAME | TYPE | SCOPE | | |
|---|---|---|---|---|---|---|
| CLASS INFORMATION | class | SH_Class1 | shared | node1,node2 | | |

| | OBJ | NAME | TYPE | GROUP | DEVNAM | DEVBLKS |
|---|---|---|---|---|---|---|
| PHYSICAL DISK INFORMATION | disk | SHDisk1 | mirror | Group1 | c1t2d0 | 8380800 |
| | disk | SHDisk2 | mirror | Group1 | c2t2d0 | 8380800 |

| | OBJ | NAME | DISKS | | | |
|---|---|---|---|---|---|---|
| GROUP INFORMATION | group | Group 1 | SHDisk1: SHDisk2 | | | |

| | OBJ | NAME | GROUP | SIZE | | |
|---|---|---|---|---|---|---|
| VOLUME INFORMATION | volume | Volume 1 | Group 1 | 1000 | | |
| | volume | Volume 2 | Group 1 | 1000 | | |
| | volume | Volume 3 | Group 1 | 1000 | | |
| | volume | Volume 4 | Group 1 | 1000 | | |

FIG.5

| OBJ | DEVNAM | DEVBLKS | DEVCONNECT |
|---|---|---|---|
| device | c1t1d0 | 8380800 | nodeA:nodeB:nodeC |
| device | c2t1d0 | 8380800 | nodeA:nodeB:nodeC |
| device | c1t2d0 | 17682084 | nodeA:nodeB:nodeC |
| device | c2t2d0 | 17682084 | nodeA:nodeB:nodeC |
| ... | ... | ... | ... |

FIG.6

```
CLASS_MAKE_KIND=default
CLASS_MAKE_CLASS_NAME=default
CLASS_SCOPE=all_node
CLASS_MAKE_DIFFERENCE_DISK="LOCAL=Class1","SHARED=SH_Class1"
CLASS_MAKE_DISK_NAME=default
GROUP_MAKE_GROUP_NAME=default
GROUP_MAKE_MIRROR_NUM=2
GROUP_MAKE_DIFFERENCE_GROUP="Class1=Group20,Group21","SH_Class1=Group10,Group11"
VOLUME_MAKE_CLASS_KIND=default
VOLUME_MAKE_CLASS_NAME=default
. . . . .
```

FIG.7

| TAG | RULE | REMARKS |
|---|---|---|
| CLASS_MAKE_KIND | RULE FOR DESIGNATING CLASS ATTRIBUTE (local,shared) | WHEN "default" IS DESIGNATED, TRANSFER DESTINATION ADOPTS CLASS ATTRIBUTES OF TRANSFER SOURCE |
| CLASS_MAKE_CLASS_NAME | RULE FOR NAMING CLASS | WHEN "default" IS DESIGNATED, TRANSFER DESTINATION ADOPTS CLASS NAME OF TRANSFER SOURCE |
| CLASS_SCOPE | RULE FOR DESIGNATING NAMES OF NODES CAPABLE OF SHARING CLASS | WHEN "all_node" IS DESIGNATED, EFFECTS IDENTICAL WITH DESIGNATION OF ALL NODES THAT CAN BE SHARED |
| CLASS_MAKE_DIFFERENCE_DISK | RULE FOR DESIGNATING CLASS TO WHICH DISK NOT INCLUDED IN TRANSFER SOURCE BELONGS | DESIGNATE IN FORMAT OF "LOCAL=DISK NAME", "SHARED=DISK NAME" |
| CLASS_MAKE_DISK_NAME | RULE FOR NAMING DISK NOT INCLUDED IN TRANSFER SOURCE | WHEN "default" IS DESIGNATED, TRANSFER DESTINATION AUTOMATICALLY GENERATES DISK NAME |
| GROUP_MAKE_GROUP_NAME | RULE FOR NAMING GROUP | WHEN "default" IS DESIGNATED, TRANSFER DESTINATION ADOPTS GROUP NAME OF TRANSFER SOURCE |
| GROUP_MAKE_MIRROR_NUM | RULE FOR DESIGNATING NUMBER OF MIRRORS FORMING MIRROR GROUP | WHEN "2" IS DESIGNATED, TRANSFER DESTINATION ESTABLISHES DOUBLE MIRROR |
| GROUP_MAKE_DIFFERENCE_GROUP | RULE FOR NAMING GROUP NOT INCLUDED IN TRANSFER SOURCE AND DESIGNATING CLASS TO WHICH GROUP BELONGS | DESIGNATE IN FORMAT OF "CLASS NAME=GROUP NAME A, GROUP NAME B,..." |
| VOLUME_MAKE_CLASS_KIND | RULE FOR DESIGNATING VOLUME ATTRIBUTES (shared, local, root) | WHEN "default" IS DESIGNATED, TRANSFER DESTINATION ADOPTS VOLUME ATTRIBUTE OF TRANSFER SOURCE |
| VOLUME_MAKE_CLASS_NAME | RULE FOR DESIGNATING CLASS TO WHICH VOLUME BELONGS | WHEN "default" IS DESIGNATED, TRANSFER DESTINATION ADOPTS CLASS TO WHICH VOLUME BELONGS OF TRANSFER SOURCE |

FIG.8

| | GENERATED COMMAND |
|---|---|
| 1 | sdxdisk -M -a -type=shared -c SH_SH_Class1 scope=nodeA:nodeB:nodeC -d c1t1d0=SHDisk1,c1t2d0=SHDisk2,c2t1d0=SHDisk3,c2t2d0=SHDisk4 |
| 2 | sdxdisk -C -c SH_Class1 -g Group1 -d SHDisk1,SHDisk2 |
| 3 | sdxdisk -C -c SH_Class1 -g Group10 -d SHDisk3,SHDisk4 |
| 4 | sdxvolume -M -c SH_Class1 -g Group1 -v Volume1 -s 1000 |
| 5 | sdxvolume -M -c SH_Class1 -g Group1 -v Volume2 -s 1000 |
| 6 | sdxvolume -M -c SH_Class1 -g Group1 -v Volume3 -s 1000 |
| 7 | sdxvolume -M -c SH_Class1 -g Group1 -v Volume4 -s 1000 |
| 8 | sdxvolume -M -c SH_Class1 -g Group10 -v Volume1 -s 1000 |
| ... | ... |

VIRTUAL VOLUME TRANSFER APPARATUS, VIRTUAL VOLUME TRANSFER METHOD, AND COMPUTER PRODUCT

This application is a continuing application, filed under 35 U.S.C. §111(a), of International Application PCT/JP2004/017731, filed Nov. 29, 2004.

BACKGROUND OF THE INVENTION

1. Field of the Invention

The present invention relates to a technology for transferring virtual volumes established on real volumes.

2. Description of the Related Art

Virtual volume managing programs are known that can form virtual volumes on real volumes such as a disk device or a Redundant Array of Independent Disks (RAID) device and provide the virtual volumes to higher-order applications.

For example, in Fujitsu Limited, "PRIMECLUSTER GDS4.X", [online], [searched on Nov. 19, 2006], Internet [URL: http://primeserver.fujitsu.com/primepower/products/soft/opt/pcl_gds_4x/>, a virtual volume managing program that can form virtual volumes on a plurality of disk devices connected to a server apparatus and perform mirroring and striping is disclosed. On the other hand, Japanese Patent Application Laid-Open No. H5-173873 discloses a technology for performing management of virtual volumes in units of job applications.

The higher-order applications can write data on and read out data from the virtual volumes by using such virtual volume managing programs without being aware of real volume configurations. It is also possible to improve fault tolerance against disk device failures by employing the technique of mirroring, and distribute the load of the access to the disk devices by employing the technique of striping.

However, in the conventional technique, in transferring virtual volumes established on a server apparatus to other server apparatuses, it is the job of a server administrator or the like to establish virtual volumes at a transfer destination after recognizing the differences in the configurations of the real volumes. In other words, the transfer of the virtual volumes is performed manually, which makes the process inefficiency.

One solution is to read-out configuration information about virtual volumes at a transfer source and reflect the configuration information on a transfer destination. However, because the configuration information includes information about a correspondence relation between virtual volumes and real volumes, it is impossible to directly reflect the configuration information on an environment in which a real volume configuration is different.

SUMMARY OF THE INVENTION

It is an object of the present invention to at least partially solve the problems in the conventional technology.

According to an aspect of the present invention, a computer-readable recording medium that stores therein a computer program that causes a computer to transfer a virtual volume established on a real volume causes the computer to execute acquiring transfer source virtual volume information from a transfer source; acquiring transfer destination real volume information from a transfer destination; generating transfer destination virtual volume information from the transfer source virtual volume information by using the transfer destination real volume information; and establishing a virtual volume at the transfer destination based on the transfer destination virtual volume information.

According to another aspect of the present invention, a method of transferring a virtual volume established on a real volume includes acquiring transfer source virtual volume information from a transfer source; acquiring transfer destination real volume information from a transfer destination; generating transfer destination virtual volume information from the transfer source virtual volume information by using the transfer destination real volume information; and establishing a virtual volume at the transfer destination based on the transfer destination virtual volume information.

According to still another aspect of the present invention, a virtual volume transfer apparatus that transfers a virtual volume established on a real volume includes an acquiring unit that acquires transfer source virtual volume information from a transfer source, and acquires transfer destination real volume information from a transfer destination; a generating unit that generates transfer destination virtual volume information from the transfer source virtual volume information by using the transfer destination real volume information; and an establishing unit that establishes a virtual volume at the transfer destination based on the transfer destination virtual volume information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic diagram for explaining a concept of volume transfer processing according to an embodiment of the present invention;

FIG. 2 is a functional block diagram of a virtual volume managing apparatus shown in FIG. 1;

FIG. 3 is a flowchart of virtual volume transfer processing;

FIG. 4 is a schematic diagram of an exemplary virtual volume information;

FIG. 5 is a schematic diagram of an exemplary hardware configuration information;

FIG. 6 is a schematic diagram for explaining an example of generation rules;

FIG. 7 is a table for explaining tags and rule contents shown in FIG. 6;

FIG. 8 is a schematic diagram for explaining an example of virtual volume establishment commands;

DETAILED DESCRIPTION OF THE PREFERRED EMBODIMENTS

Figure 9:
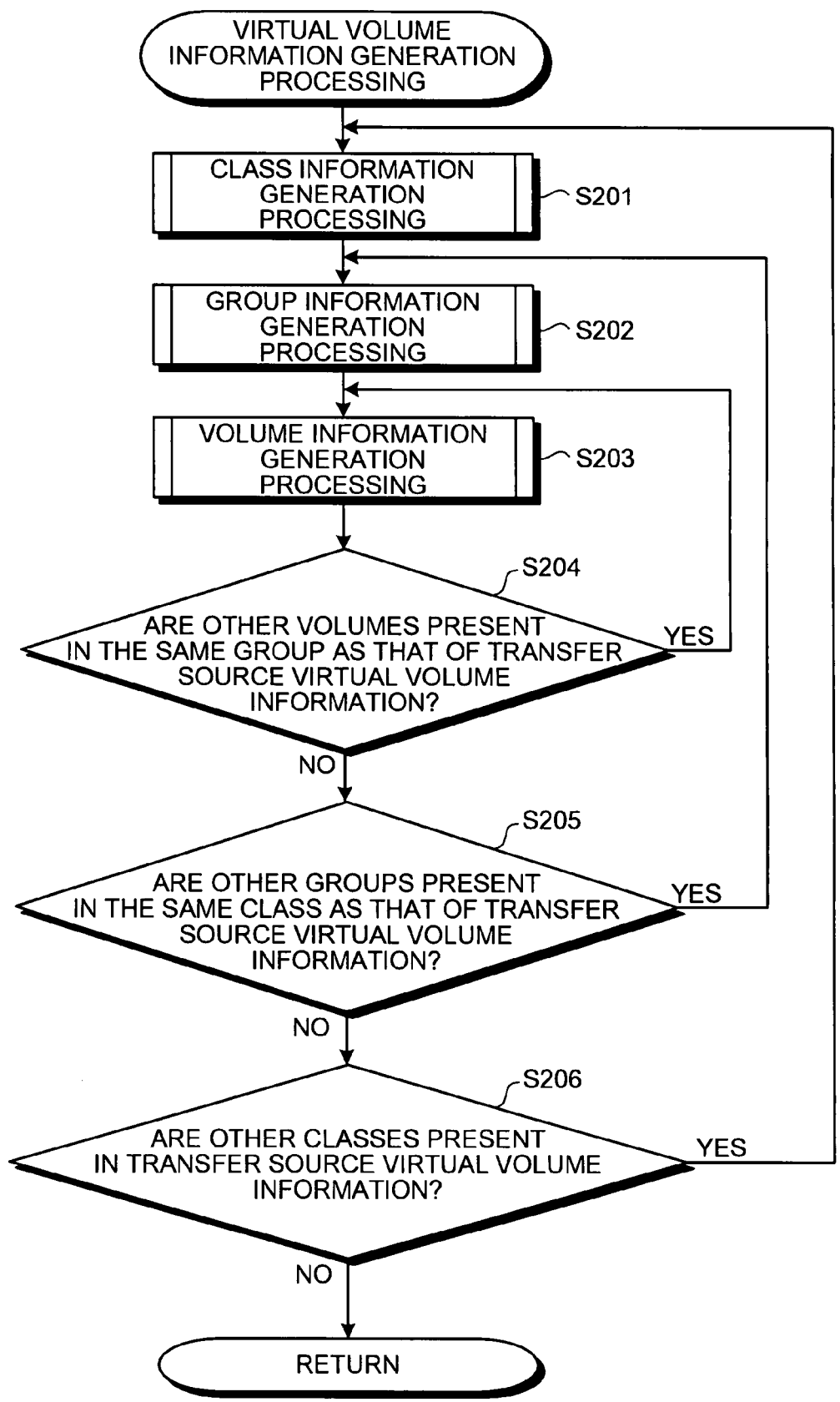
FIG. 9 is a flowchart of virtual volume information generation processing.

Exemplary embodiments of the present invention are explained in detail below with reference to the accompanying drawings. The present invention is not limited by the embodiments.

FIG. 1 is a schematic diagram for explaining a concept of virtual volume transfer processing according to an embodiment of the present invention. Each of virtual volume managing apparatuses shown in the figure establish a virtual volume, which reflects a configuration of real volumes, and manages configuration information of the established virtual volume as virtual volume information. The virtual volume information is information including a correspondence relation between real volumes and virtual volumes. For example, one virtual volume is formed by mirroring two real volumes.

When such a virtual volume is transferred to another virtual volume managing apparatus, the differences in real volume configurations between a transfer source and a transfer destination becomes an issue. Precisely, because the virtual volume information at the transfer source is information reflecting a real volume configuration at the transfer source, it is impossible to transfer the virtual volume to the transfer destination even if the virtual volume information at the transfer source is directly applied to the transfer destination.

As shown in FIG. 1, assume that the virtual volume managing apparatus at the transfer source (which is on the left in FIG. 1) has two real volumes, and that the virtual volume managing apparatus at the transfer destination (which is on the right in FIG. 1) has three real volumes. Because virtual volume information at the transfer source includes only information about the two real volumes, it is unknown what kind of virtual volume the virtual volume managing apparatus at the transfer destination having the three real volumes establishes. Even if the number of real volumes at the transfer source and the number of real volumes at the transfer destination are the same, the sizes of the real volumes at the transfer source and at the transfer destination could be different.

If the real volume configurations are different, it is not easy to automatically perform processing for transferring a virtual volume. Conventionally, the transfer of the virtual volume is performed manually, which made the process inefficient.

On the contrary, according to an embodiment of the present invention, the virtual volume managing apparatus at the transfer destination acquires hardware configuration information concerning the real volumes connected to itself and edits virtual volume information at the transfer source using this hardware configuration information. In editing the virtual volume information, the virtual volume managing apparatus employs certain edition rules when there are differences in the real volume configurations between the transfer source and the transfer destination or there are differences in nodes that share real volumes.

FIG. 2 is a functional block diagram of a virtual volume managing apparatus 1 installed with a virtual volume managing program according to an embodiment of the present invention. As shown in the figure, the virtual volume managing apparatus 1 includes an input unit 2, a disk control interface (I/F) unit 3, an output unit 4, a virtual-volume-transfer processing unit 10, and a storing unit 20.

The virtual-volume-transfer processing unit 10 includes an import-information reading unit 11, a hardware-configuration-information reading unit 12, a generation-rule reading unit 13, a virtual-volume-information generating unit 14, a virtual-volume establishing unit 15, and a transfer processing unit 16. The storing unit 20 includes a hardware-configuration-information storing unit 21, a generation-rule storing unit 22, and a virtual-volume-information storing unit 23.

The input unit 2 is constituted by a portable medium device such as a compact disc read only memory (CD-ROM) device (not shown), a communication interface device (not shown), and the like. The input unit 2 receives virtual volume information at a transfer source read out from another virtual volume managing apparatus 1 and passes the virtual volume information to the virtual-volume-transfer processing unit 10.

The disk control I/F unit 3 performs processing for input to and output from a storage device, such as a disk device and a RAID device, connected to the virtual volume managing apparatus 1. The output unit 4 is constituted by a portable medium device such as a CD-ROM device (not shown), a communication interface device (not shown), and the like. The output unit 4 outputs the virtual volume information received from the virtual-volume-transfer processing unit 10 to other virtual volume managing apparatuses.

The virtual-volume-transfer processing unit 10 receives the virtual volume information at the transfer source and generates virtual volume information matching a hardware environment of the virtual volume managing apparatus 1 by editing the virtual volume information received using hardware configuration information and generation rules. The virtual-volume-transfer processing unit 10 establishes a virtual volume by reflecting the virtual volume information generated on the virtual volume managing apparatus 1. The virtual-volume-transfer processing unit 10 writes the generated virtual volume information in the storing unit 20 and, when there is a request from the other virtual volume managing apparatus, sends the virtual volume information to the other virtual volume managing apparatus.

The import-information reading unit 11 receives the virtual volume information at the transfer source from the input unit 2, and passes the virtual volume information to the virtual-volume-information generating unit 14. The hardware-configuration-information reading unit 12 reads out hardware configuration information concerning the virtual volume managing apparatus 1 from the hardware-configuration-information storing unit 21 and passes the hardware configuration information to the virtual-volume-information generating unit 14. The generation-rule reading unit 13 receives generation rules from the generation-rule storing unit 22 and passes the generation rules to the virtual-volume-information generating unit 14.

The virtual-volume-information generating unit 14 generates virtual volume information concerning the virtual volume managing apparatus 1 by using the virtual volume information at the transfer source, the hardware configuration information concerning the virtual volume managing apparatus 1, and the generation rules passed from the import-information reading unit 11, the hardware-configuration-information reading unit 12, and the generation-rule reading unit 13, respectively. Specifically, the virtual-volume-information generating unit 14 performs edition processing for, for example, replacing real volume information at the transfer source included in the virtual volume information at the transfer source with real volume information included in the hardware configuration information concerning the virtual volume managing apparatus 1. Particularly, the virtual-volume-information generating unit 14 generates virtual volume information reflecting the hardware configuration information concerning the virtual volume managing apparatus 1 according to edition rules included in the generation rules. Although it is explained here that the virtual-volume-information generating unit 14 generates a virtual volume establishment command as such virtual volume information, the virtual-volume-information generating unit 14 can be configured to generate a data file indicating a configuration of a virtual volume instead of the command.

The virtual-volume establishing unit 15 establishes a virtual volume by reflecting the virtual volume information generated by the virtual-volume-information generating unit 14 on the virtual volume managing apparatus 1. Although it is explained here that the virtual-volume establishing unit 15 establishes a virtual volume by executing a command string received as virtual volume information, the virtual-volume establishing unit 15 can be configured to establish a virtual volume by transferring a data file indicating a configuration of the virtual volume to respective real volumes.

The transfer processing unit 16 retrieves the virtual volume information from the virtual-volume-information storing unit 23, and sends the retrieved virtual volume information to the other virtual volume managing apparatus 1 via the output unit 4.

The storing unit 20 is constituted by a storage device such as a hard disk device (not shown) and stores therein the hardware configuration information, the generation rules, and the virtual volume information concerning the virtual volume managing apparatus 1. Although the storing unit 20 is shown to be a part of the virtual volume managing apparatus 1 in FIG. 2, the storing unit 20 can be an independent unit such as a hard disk device or a RAID device. When the storing unit 20 is provided as an independent unit, it can be connected to the virtual volume managing apparatus 1 via the disk control I/F unit 3.

The hardware-configuration-information storing unit 21 stores therein hardware configuration information such as identification names, area sizes, and shared node names of disk devices included in the virtual volume managing apparatus 1 and disk devices connected to the disk control I/F unit 3. The generation-rule storing unit 22 stores therein rules in performing edition processing for replacing real volume information at the transfer source included in the virtual volume information at the transfer source with real volume information included in the hardware configuration information concerning the virtual volume managing apparatus 1.

The virtual-volume-information storing unit 23 stores therein the virtual volume information concerning the virtual volume managing apparatus 1 generated by the virtual-volume-information generating unit 14. When the virtual volume is transferred to another environment, the virtual volume information is read out by the transfer processing unit 16 and provided to the other virtual volume managing apparatus 1 via the output unit 4.

FIG. 3 is a flowchart of the virtual volume transfer processing. First, the import-information reading unit 11 reads transfer source virtual volume information via the input unit 2 (step S101). FIG. 4 is a schematic diagram of an example of the virtual volume information.

As shown in FIG. 4, the virtual volume information is information including class information, physical disk information belonging to a class, group information, and volume information. The virtual volume information is layered in this way. A highest layer of the virtual volume information is a layer called "class object". In FIG. 4, only one class object is included in the virtual volume information. However, a plurality of class objects may be included in the virtual volume information.

The class information is information including "OBJ" indicating a type of an object, "NAME" indicating a class name, "TYPE" indicating a type of a class, and "SCOPE" indicating sharing destinations of the class. In the example shown in FIG. 4, a type of an object is a class because "OBJ" is "class", a class name is SH_Class1 because "NAME" is "SH_Class1", a type of the class is a shared class because "TYPE" is "shared", and sharing destinations of the class are node1 and node2 because "SCOPE" is "node1, node2".

The physical disk information is information including "OBJ" indicating a type of an object, "NAME" indicating a physical disk name, "TYPE" indicating a type of a physical disk, "GROUP" indicating a group to which the physical disk belongs, "DEVNAM" indicating a device name of the physical disk, and "DEVBLKS" indicating the number of blocks of the physical disk. In the example shown in FIG. 4, a type of an object is a physical disk because "OBJ" is "disk" and physical disk names are SHDisk1 and SHDisk2 because "NAME" is "SHDisk1" and "SHDisk2".

A double mirror is formed by SHDisk1 and SHDisk2 because "TYPE" is "mirror". SHDisk1 and SHDisk2 belong to Group1, device names are c1$t$2$d$0 and c2$t$2$d$0, the number of blocks is 8380800 for both the physical disks.

The group information is information including "OBJ" indicating a type of an object, "NAME" indicating a group name, and "DISKS" indicating physical disks belonging to a group. In the example shown in FIG. 4, a type of an object is a group, a group name is Group1, and physical disks belonging to the group are SHDisk1 and SHDisk2.

The volume information is information including "OBJ" indicating a type of an object, "NAME" indicating a volume name, "GROUP" indicating a name of a group to which a volume belongs, and "SIZE" indicating a size of the volume. In the example shown in FIG. 4, a type of an object is a volume, there are four volumes Volume1 to Volume4, these volumes belong to Group1, and sizes of all the volumes are 1000.

Referring back to FIG. 3, after reading the virtual volume information, the import-information reading unit 11 judges whether contents of the virtual volume information are normal by checking a format of the virtual volume information (step S102). When the contents are not normal (No at step S102), the import-information reading unit 11 performs error processing such as display and transmission of error information (step S109) and finishes the processing. On the other hand, when the contents are normal (Yes at step S102), the import-information reading unit 11 reads hardware confirmation information concerning the virtual volume managing apparatus 1 from the hardware-configuration-information storing unit 21 (step S103).

FIG. 5 is a schematic diagram of an example of the hardware configuration information. As shown in the figure, the hardware configuration information is information including "OBJ" indicating a type of an object, "DEVNAM" indicating a device name of a physical disk, "DEVBLKS" indicating the number of blocks of the physical disk, and "DEVCONNECT" indicating names of nodes that share the physical disk.

In the example shown in FIG. 5, four physical disks are connected to the virtual volume managing apparatus 1. Device names of the physical disks are c1$t$1$d$0, c2$t$1$d$0, c1$t$2$d$0, and c2$t$2$d$0, respectively. The number of blocks of the physical blocks with the device names c1$t$1$d$0 and c2$t$1$d$0 is 8380800. The number of blocks of the physical disks with the device names c1$t$2$d$0 and c2$t$2$d$0 is 17682084. All the physical blocks are shared by three nodes, a node A, a node B, and a node C.

Referring back to FIG. 3, after reading the hardware configuration information, the import-information reading unit 11 judges whether contents of the hardware configuration information are normal by checking the hardware configuration information (step S104). When the contents are not normal (No at step S104), the import-information reading unit 11 acquires the hardware configuration information again (step S110) and performs the judgment processing at step S104. In this embodiment, when the hardware configuration information is not normal, the import-information reading unit 11 acquires the hardware configuration information again. However, the import-information reading unit 11 may perform the error processing (step S109) without acquiring the hardware configuration information again and finish the processing.

On the other hand, when the contents of the hardware configuration information are normal (Yes at step S104), the import-information reading unit 11 reads a rule file including generation rules from the generation-rule storing unit 22 (step S105). FIG. 6 is a schematic diagram of an example of the generation rules. As shown in FIG. 6, the generation rules take a format in which a tag indicating a type of a rule and a content of the rule are described on both sides of an "=" sign.

Tags shown in FIG. 6 include tags starting with "CLASS_" corresponding to the "class information", tags starting with "GROUP_" corresponding to the "group information", and tags starting with "VOLUME_" corresponding to the "volume information". It is possible to define edition rules for each of the class information, the group information, and the volume information.

FIG. 7 is a table for explaining the tags and the rule contents shown in FIG. 6. For example, a "CLASS_MAKE_DIFFERENCE_DISK" tag is a tag indicating, when a physical disk not included in the virtual volume information at the transfer source is included in the hardware configuration information concerning the virtual volume managing apparatus 1, designation rules for a class to which such a physical disk belongs. A "CLASS_MAKE_DISK_NAME" tag is a tag indicating, when a physical disk not included in the virtual volume information at the transfer source is included in the hardware configuration information concerning the virtual volume managing apparatus 1, naming rules for such a physical disk. A "GROUP_MAKE_DIFFERENCE_GROUP" tag is a tag indicating, when a group not included in the virtual volume information at the transfer source is included in the hardware configuration information concerning the virtual volume managing apparatus 1, naming rules of such a group.

When the physical disk information of the virtual volume information at the transfer source shown in FIG. 4 and the hardware configuration information concerning the virtual volume managing apparatus 1 shown in FIG. 5 are compared, the physical disk with DEVNAM c1t2d0 and the physical disk with DEVNAM c2t2d0 in FIG. 5 are not included in the physical disk information in FIG. 4. In the rules shown in FIG. 6, since a rule content of the "CLASS_MAKE_DISK_NAME" tag is "default", as shown in FIG. 7, a physical disk name is automatically created at the transfer destination. Therefore, a physical disk name of the physical disk with DEVNAM c1t2d0 and a physical disk name of the physical disk with DEVNAM c2t2d0 are, for example, SHDisk3 and SHDisk4, which are consecutive from the physical disk names (SHDisk1 and SHDisk2) at the transfer source.

In the rules shown in FIG. 6, a rule content of the "CLASS_MAKE_DIFFERENCE_DISK" tag is "'LOCAL=Class1'", "SHARED=SH_Class1'". Thus, as shown in FIG. 7, a class to which a physical disk not present in the transfer source belongs is "Class1" when the physical disk is a local disk and is "SH_Class1" when the physical disk is a shared disk.

Referring back to FIG. 3, after reading the rule file, the import-information reading unit 11 judges whether contents of the rule file are normal by checking the rule file (step S106). When the contents are not normal (No at step S106), the import-information reading unit 11 applies default generation rules to generation of virtual volume information (step S111). The default generation rules mean generation rules applied when designation of the respective tags are omitted as indicated by "default" shown in the space of remarks in FIG. 7.

On the other hand, when the contents of the rule file are normal (Yes at step S106), the virtual-volume-information generating unit 14 performs processing for generating virtual volume information (step S107). The virtual-volume establishing unit 15 establishes a virtual volume by executing a command included in the virtual volume information (step S108) and finishes the processing.

FIG. 8 is a schematic diagram for explaining an example of virtual volume establishment commands generated by the virtual-volume-information generating unit 14. For example, a command 1 is a command for instructing that SH_Class1 is formed from the four physical disks SHDisk1 to SHDisk4 and the node A, the node B, and the node C share SH_Class1. The virtual-volume-information generating unit 14 generates a string of these commands. The virtual-volume establishing unit 15 establishes a virtual volume in the virtual volume managing apparatus 1 by executing the commands generated.

FIG. 9 is a flowchart of the virtual volume information generation processing at step S107 in FIG. 3. As shown in the figure, in this virtual volume information generation processing, the virtual-volume-information generating unit 14 performs class information generation processing (step S201), group information generation processing (step S202), and volume information generation processing (step S203). Details of the processing at steps S201 to S203 are described later.

Subsequently, the virtual-volume-information generating unit 14 judges whether other volumes are present in the same group as that of the transfer source virtual volume information (step S204). When other volumes are present (Yes at step S204), the virtual-volume-information generating unit 14 performs the volume information generation processing again (step S203). The virtual-volume-information generating unit 14 repeats the processing procedures at steps S203 to S204 until all volumes included in the same group as that of the transfer source virtual volume information are read.

When all the volumes included in the identical group of the transfer source virtual volume information are read (No at step S204), the virtual-volume-information generating unit 14 judges whether other groups are present in an identical class of the transfer source virtual volume information (step S205). When other groups are present (Yes at step S205), the virtual-volume-information generating unit 14 generates virtual volume information at a transfer destination corresponding to all the groups included in the identical class of the transfer source virtual volume information and all volumes included in the respective groups by repeating the processing procedures at steps S202 to S204.

Subsequently, when all the groups and volumes included in the identical class of the transfer source virtual volume information are read (No at step S205), the virtual-volume-information generating unit 14 judges whether other classes are present in the transfer source virtual volume information (step S206). When other classes are present (Yes at step S206), the virtual-volume-information generating unit 14 generates virtual volume information at the transfer destination corresponding to the classes, groups, and the volumes included in the transfer source virtual volume information by repeating the processing procedures at steps S201 to S205. When the generation of the virtual volume information at the transfer destination is completed for all the classes, groups, and volumes (No at step S206), the virtual-volume-information generating unit 14 finishes the processing.

Figure 10:
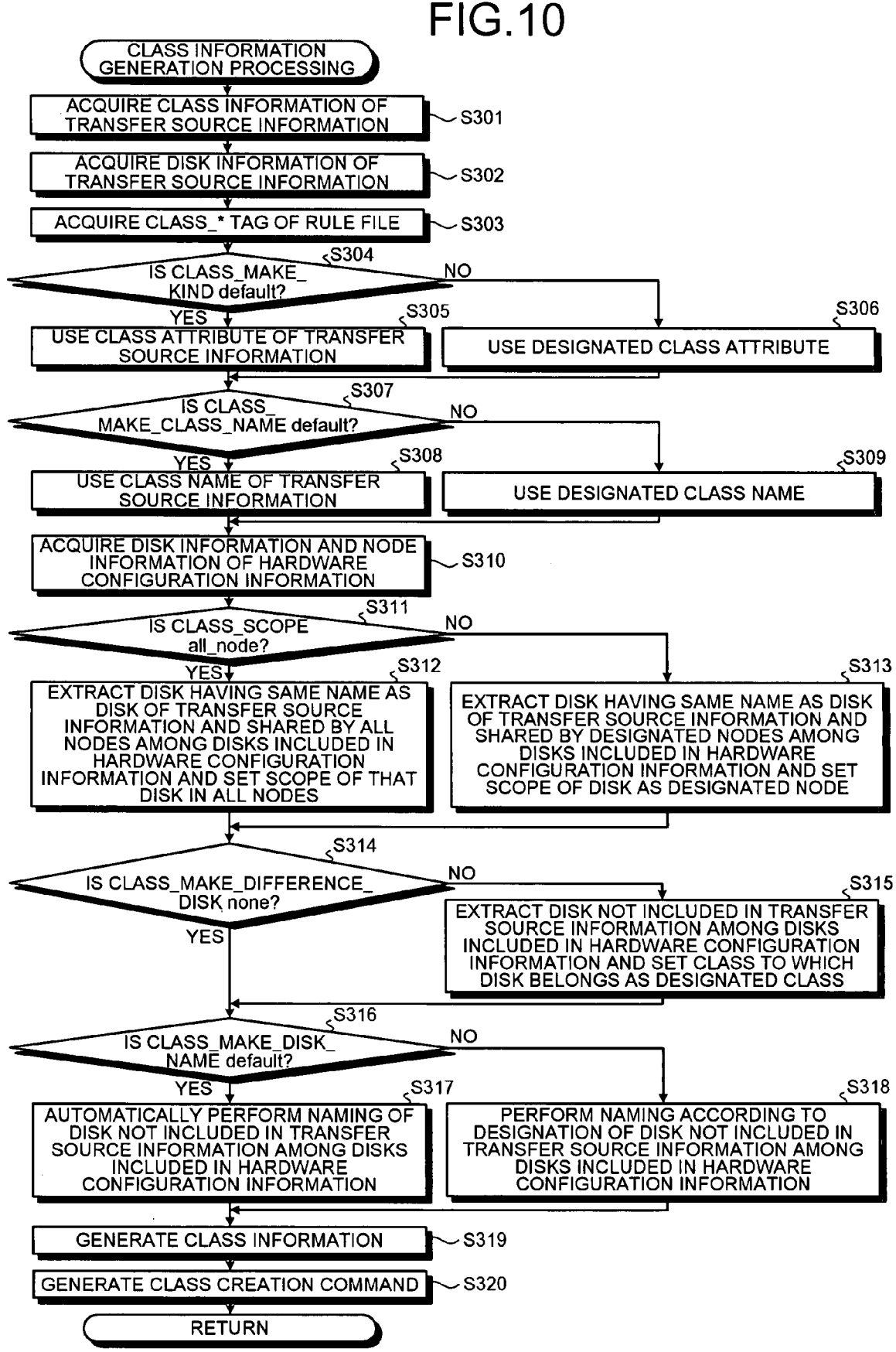
FIG. 10 is a flowchart of class information generation processing.

FIG. 10 is a flowchart of the class information generation processing at step S201 in FIG. 9. As shown in the figure, in the class information generation processing, the virtual-volume-information generating unit 14 acquires class information of transfer source virtual volume information (hereinafter, "transfer source information") (step S301), acquires physical disk information of the transfer source information (step S302), and acquires tags starting with "CLASS_" from the rule file (step S303).

Subsequently, the virtual-volume-information generating unit 14 judges whether default is set in a CLASS_MAKE_KIND tag acquired from the rule file (step S304). When default is set in this tag (Yes at step S304), the virtual-volume-information generating unit 14 uses a class attribute of the transfer source information (step S305). On the other hand, when default is not set in the tag (No at step S304), the virtual-volume-information generating unit 14 uses a class attribute designated in the tag (step S306).

The virtual-volume-information generating unit 14 judges whether default is set in a CLASS_MAKE_CLASS_NAME tag acquired from the rule file (step S307). When default is set in this tag (Yes at step S307), the virtual-volume-information generating unit 14 uses a class name of the transfer source information (step S308). On the other hand, when default is not set in the tag (No at step S307), the virtual-volume-information generating unit 14 uses a class name designated in the tag (step S309).

Subsequently, the virtual-volume-information generating unit 14 acquires disk information and node information of the hardware configuration information concerning the virtual volume managing apparatus 1 (step S310). The virtual-volume-information generating unit 14 judges whether all_node is set in a CLASS_SCOPE tag acquired from the rule file (step S311). When all_node is set in this tag (Yes at step S311), the virtual-volume-information generating unit 14 extracts a physical disk having the same name as a physical disk of the transfer source information and shared by all nodes among physical disks included in the hardware configuration information concerning the virtual volume managing apparatus 1 and sets a scope of the physical disk in all the nodes (step S312).

On the other hand, when all_node is not set in the CLASS_SCOPE tag (No at step S311), the virtual-volume-information generating unit 14 extracts a physical disk having the same name as the physical disk of the transfer source information and shared by nodes designated in the CLASS_SCOPE tag among the physical disks included in the hardware configuration information concerning the virtual volume managing apparatus 1 and sets a scope of the physical disk as a designated node.

The virtual-volume-information generating unit 14 judges whether none is set in a CLASS_MAKE_DIFFERENCE tag acquired from the rule file (step S314). When none is set in this tag (Yes at step S314), the virtual-volume-information generating unit 14 performs the processing procedure at step S315. On the other hand, when none is not set in the tag (No at step S314), the virtual-volume-information generating unit 14 extracts a physical disk not included in the transfer source information among the physical disks included in the hardware configuration information concerning the virtual volume managing apparatus 1 and sets a class to which the physical disk belongs as a class designated in the CLASS_MAKE_DIFFERENCE tag (step S315).

The virtual-volume-information generating unit 14 judges whether default is set in a CLASS_MAKE_DISK_NAME tag acquired from the rule file (step S316). When default is set in this tag (Yes at step S316), the virtual-volume-information generating unit 14 automatically performs naming of a physical disk not included in the transfer source information among the physical disks included in the hardware configuration information concerning the virtual volume managing apparatus 1 (step S317). For example, when physical disk names included in the transfer source information are Disk1 and Disk2 and three physical disks are included in the hardware configuration information concerning the virtual volume managing apparatus, the virtual-volume-information generating unit 14 names the physical disks as Disk1, Disk2, and Disk3.

On the other hand, when default is not set in the CLASS_MAKE_DISK_NAME tag (No at step S316), the virtual-volume-information generating unit 14 performs naming of a physical disk not included in the transfer source information among the physical disks included in the hardware configuration information concerning the virtual volume managing apparatus 1 according to designation (step S319). For example, when physical disk names included in the transfer source information are Disk1 and Disk2, three physical disks are included in the hardware configuration information concerning the virtual volume managing apparatus 1, and Disk10 is designated as a physical disk name, the virtual-volume-information generating unit 14 names the physical disks as Disk1, Disk2, and Disk10.

The virtual-volume-information generating unit 14 generates class information based on results of the judgments of the respective judgment procedures (step S319). The virtual-volume-information generating unit 14 generates a class creation command corresponding to the class information generated (step S320). For example, the command 1 shown in FIG. 8 corresponds to this class creation command.

Figure 11:
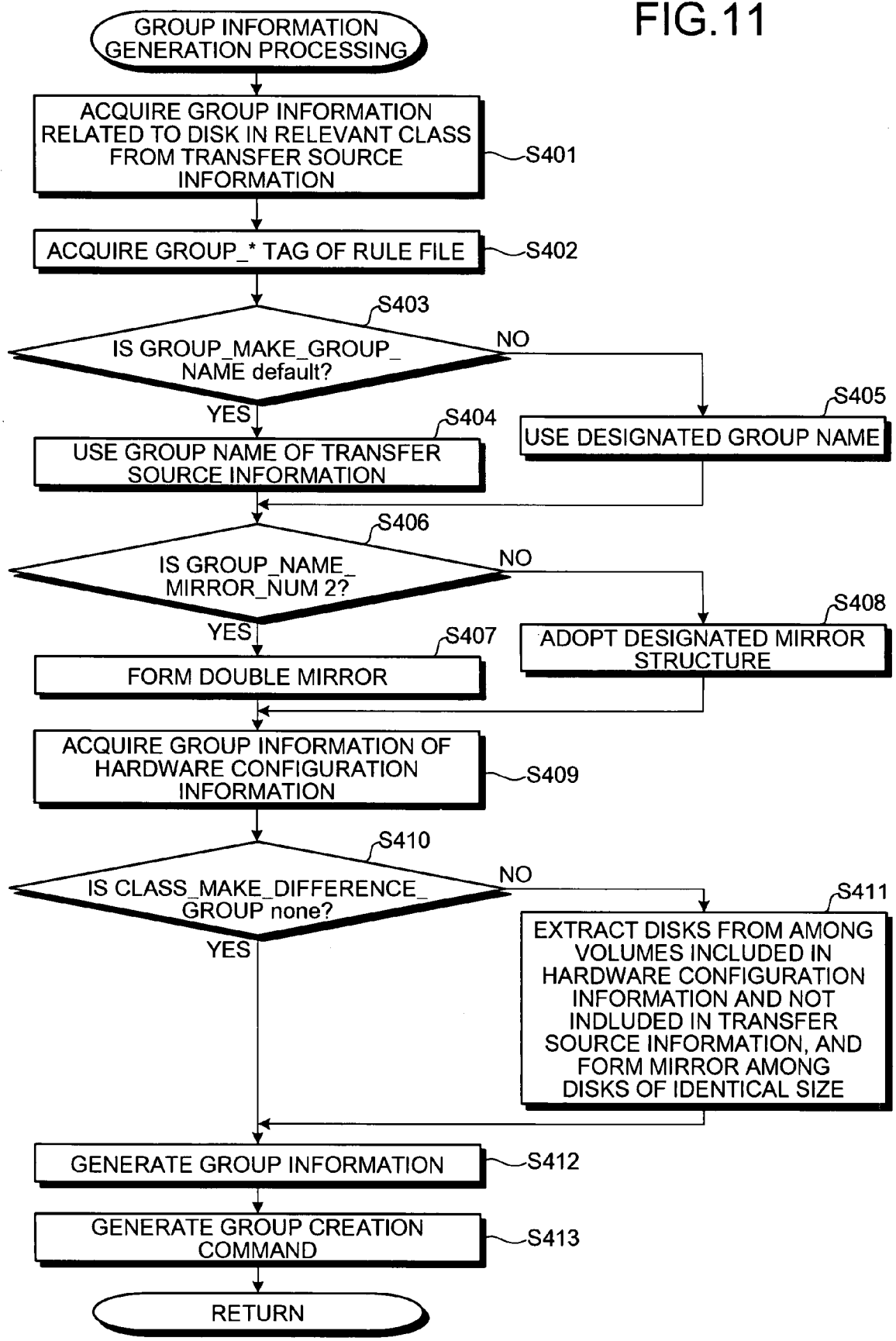
FIG. 11 is a flowchart of group information generation processing.

FIG. 11 is a flowchart of the group information generation processing at step S202 in FIG. 9. As shown in the figure, in the group information generation processing, the virtual-volume-information generating unit 14 acquires group information related to a disk in a relevant class from the transfer source information (step S401). The virtual-volume-information generating unit 14 acquires tags starting with "GROUP_" from the rule file (step S402).

Subsequently, the virtual-volume-information generating unit 14 judges whether default is set in a GROUP_MAKE_GROUP_NAME tag acquired from the rule file (step S403). When default is set in this tag (Yes at step S403), the virtual-volume-information generating unit 14 uses a group name of the transfer source information (step S404). On the other hand, when default is not set in the tag (No at step S403), the virtual-volume-information generating unit 14 uses a group name designated in the tag (step S405).

The virtual-volume-information generating unit 14 judges whether 2 is set in a GROUP_MAKE_MIRROR_NUM tag acquired from the rule file (step S406). When 2 is set in this tag (Yes at step S406), the virtual-volume-information generating unit 14 forms a double mirror (step S407). On the other hand, when 2 is not set in the tag (No at step S406), the virtual-volume-information generating unit 14 adopts a mirror structure corresponding to a number designated in the tag (step S408).

The virtual-volume-information generating unit 14 acquires group information of the hardware configuration information concerning the virtual volume managing apparatus 1 (step S409). The virtual-volume-information generating unit 14 judges whether none is set in a CLASS_MAKE_DIFFERENCE_GROUP acquired from the rule file (step S410). When none is set in this tag (Yes at step S410), the virtual-volume-information generating unit 14 performs a processing procedure at step S412. On the other hand, when none is set in the tag (No at step S410), the virtual-volume-information generating unit 14 extracts disks not included in the transfer source information among volumes included in the hardware configuration information concerning the virtual volume managing apparatus 1 and forms a mirror among disks of an identical size (step S411).

The virtual-volume-information generating unit 14 generates group information based on results of the judgments of the respective judgment procedures (step S412). The virtual-volume-information generating unit 14 generates a group creation command corresponding to the group information generated (step S413). For example, the command 2 and the command 3 shown in FIG. 8 correspond to this group creation command.

Figure 12:
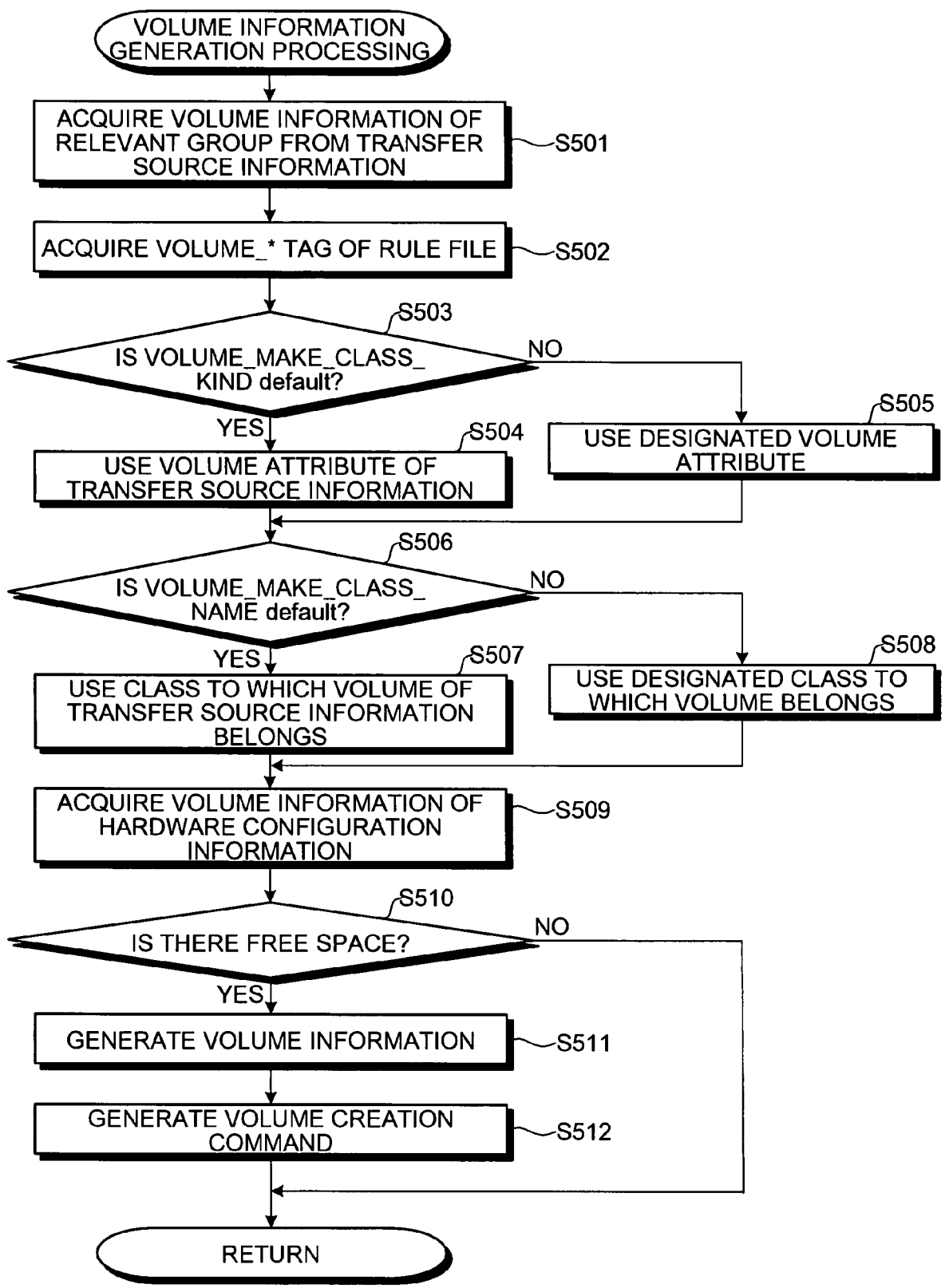
FIG. 12 is a flowchart of volume information generation processing.

FIG. 12 is a flowchart for explaining a processing procedure of the volume information generation processing at step S203 in FIG. 9. As shown in the figure, in the volume information generation processing, the virtual-volume-information generating unit 14 acquires volume information in a relevant group from the transfer source information (step S501). The virtual-volume-information generating unit 14 acquires tags starting with "VOLUME_" from the rule file (step S502).

Subsequently, the virtual-volume-information generating unit 14 judges whether default is set in a VOLUME_MAKE_CLASS_KIND tag acquired from the rule file (step S503). When default is set in this tag (Yes at step S503), the virtual-volume-information generating unit 14 uses a volume attribute of the transfer source information. On the other hand, when default is not set in the tag (No at step S503), the virtual-volume-information generating unit 14 uses a volume attribute designated in the tag (step S505).

The virtual-volume-information generating unit 14 judges whether default is set in a VOLUME_MAKE_CLASS_NAME tag acquired from the rule file (step S506). When default is set in this tag (Yes at step S506), the virtual-volume-information generating unit 14 uses a class to which a volume belongs of the transfer source information (step S507). On the other hand, when default is not set in the tag (No at step S506), the virtual-volume-information generating unit 14 uses a class to which a volume belongs designated in the tag (step S508).

The virtual-volume-information generating unit 14 acquires volume information of the hardware configuration information concerning the virtual volume managing apparatus 1 (step S509) and judges whether there is a free space in a physical disk included in the hardware configuration information (step S510). When there is a free space (step S510), the virtual-volume-information generating unit 14 generates volume information based on results of the judgments of the respective judgment procedures (step S511). The virtual-volume-information generating unit 14 generates a volume creation command corresponding to the volume information generated (step S512). For example, the commands 4 to 8 shown in FIG. 4 correspond to this volume creation command. When there is no free space in the physical disk included in the hardware configuration information (No at step S510), the virtual-volume-information generating unit 14 finishes the processing without creating volume information and a volume creation command.

As described above, in this embodiment, in the virtual volume managing apparatus at the transfer destination, the hardware-configuration-information reading unit acquires hardware configuration information concerning real volumes connected to the virtual volume managing apparatus. The virtual-volume-information generating unit edits virtual volume information at the transfer source read by the import-information reading unit by using this hardware configuration information. In editing the virtual volume information, the virtual-volume-information generating unit uses edition rules applied when there is a difference in the numbers and sizes of real volumes between the transfer source and the transfer destination and a difference in nodes that share real volumes.

The virtual-volume-information generating unit generates virtual volume information concerning the virtual volume managing apparatus by performing edition processing according to the edition rules read by the generation-rule reading unit. The virtual-volume establishing unit performs import processing for a virtual volume by reflecting this virtual volume information on the real volumes. Thus, even when a real volume configuration at the transfer source and a real volume configuration at the transfer destination are different, it is possible to efficiently perform the transfer processing for the virtual volume.

Figure 13:
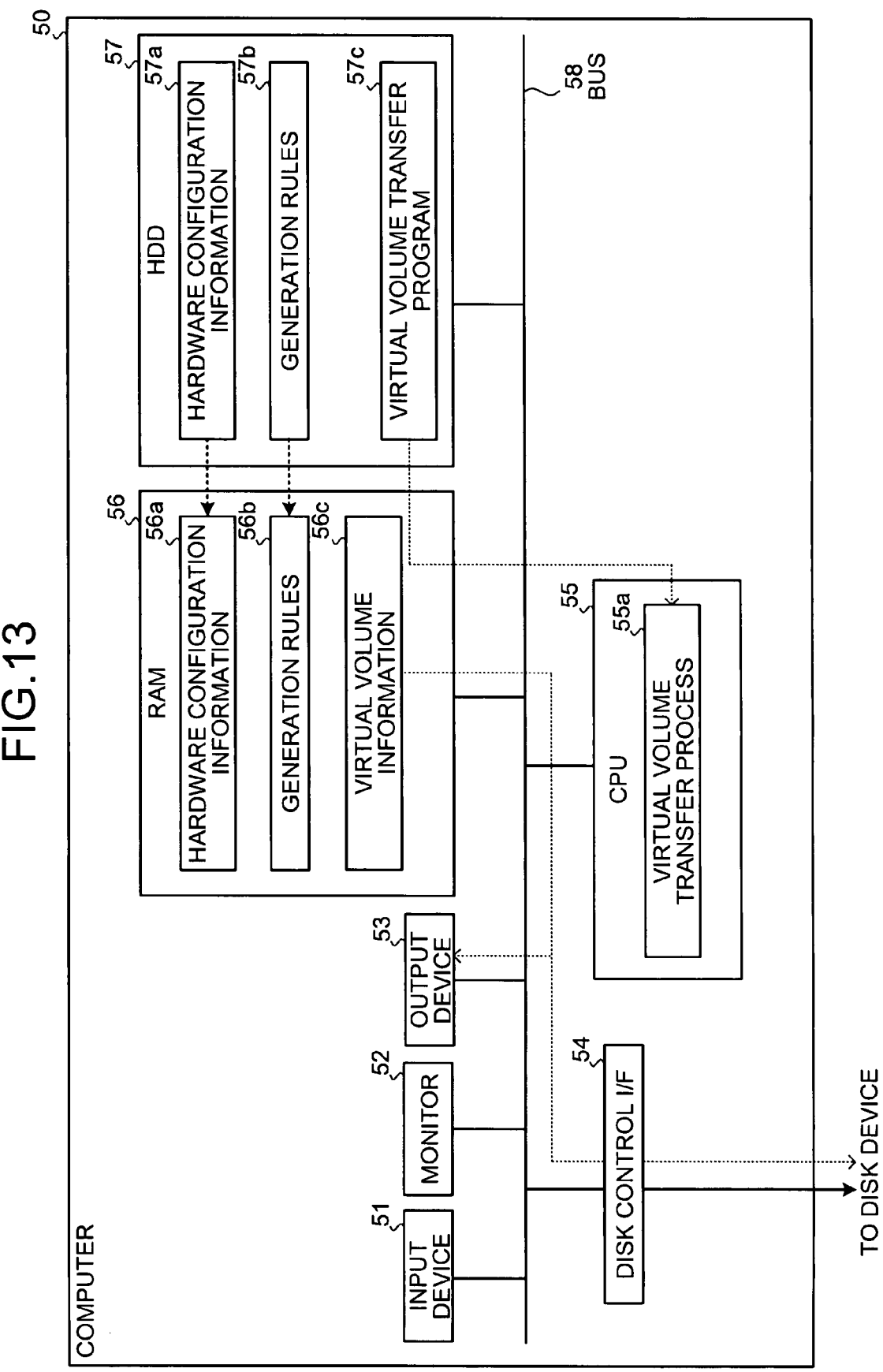
FIG. 13 is a functional block diagram of a computer that executes a virtual volume transfer program.

It is possible to realize the various kinds of processing explained in the embodiment by executing programs prepared in advance with a computer. FIG. 13 is a diagram of an example of a computer that executes a virtual volume transfer program having the same functions as the embodiment.

As shown in the figure, a computer 50 as a virtual volume transfer apparatus is constituted by connecting an input device 51, a monitor 52, an output device 53, a disk control I/F 54, a central processing unit (CPU) 55, a random access memory (RAM) 56, and a hard disk (HD) 57 through a bus 58. The input device 51 corresponds to the input unit 2 shown in FIG. 2. The monitor 52 and the output device 53 correspond to the output unit 4 in FIG. 2. The disk control I/F 54 corresponds to the disk control I/F unit 3 shown in FIG. 2.

In the HD 57, hardware configuration information 57a, generation rules 57b, and a virtual volume transfer program 57c are stored in advance. The hardware configuration information 57a corresponds to the hardware-configuration-information storing unit 21 shown in FIG. 2. The generation rules 57b correspond to the generation-rule storing unit 22 shown in FIG. 2.

When the CPU 55 reads out and executes the virtual volume transfer program 57c in HD 57, as shown in FIG. 13, the virtual volume transfer program 57c functions as a virtual volume transfer process 55a. When the virtual volume transfer process 55a functions, the hardware configuration information 57a and the generation rules 57b in the HD 57 are expanded in the RAM 56 and stored as hardware configuration information 56a and generation rules 56b.

Virtual volume information 56c generated by the virtual volume transfer process 55a is stored in the RAM 56 and transmitted to the respective disk devices through the disk control I/F 54. When requested by a server administrator or the like, the virtual volume information 56c is provided to other computers 50 via the output device 53.

According to an aspect of the present invention, even when a real volume configuration at the transfer source and a real volume configuration at the transfer destination are different, it is possible to efficiently perform processing for establishing virtual volumes.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable, non-transitory medium that stores therein a computer program that causes a computer to transfer a virtual volume established on a real volume, the computer program causing the computer to execute:

storing rule information in a storage unit of a transfer destination;

acquiring first configuration information about virtual volume established on a real volume of a transfer source;

acquiring second configuration information about real volume of the transfer destination;

generating third configuration information about virtual volume for the real volume of the transfer destination from the first configuration information by reflecting the second configuration information on the first configuration information based on the rule information stored at the storing, wherein the rule information includes a rule applied when there is a difference between sizes of the real volume of the transfer source and the real volume of the transfer destination or a difference between the number of real volumes of the transfer source and real volumes of the transfer destination, or when a way a real volume is shared by nodes is different between the transfer source and the transfer destination; and establishing a virtual volume on the real volume of the transfer destination based on the third configuration information.

2. The computer-readable, non-transitory medium according to claim 1, wherein the generating includes replacing real volume information included in the transfer source virtual volume information with the transfer destination real volume information based on the rule information.

3. The computer-readable, non-transitory medium according to claim 1, wherein the generating includes generating a command for establishing a virtual volume as the transfer destination virtual volume information, and the establishing includes establishing a virtual volume at the transfer destination according to execution of the command generated at the generating.

4. The computer-readable, non-transitory medium according to claim 1, wherein the computer program further causes the computer to execute:

retrieving the transfer destination virtual volume information stored in the storage unit; and sending the transfer destination virtual volume information retrieved at the retrieving.

5. A method of transferring a virtual volume established on a real volume, the method comprising:

storing rule information in a storage unit of a transfer destination;

acquiring first configuration information about virtual volume established on a real volume of a transfer source;

acquiring second configuration information about real volume of the transfer destination;

generating third configuration information about virtual volume for the real volume of the transfer destination from the first configuration information by reflecting the second configuration information on the first configuration information based on the rule information stored at the storing, wherein the rule information includes a rule applied when there is a difference between sizes of the real volume of the transfer source and the real volume of the transfer destination or a difference between the number of real volumes of the transfer source and real volumes of the transfer destination, or when a way a real volume is shared by nodes is different between the transfer source and the transfer destination; and establishing a virtual volume on the real volume of the transfer destination based on the third configuration information.

6. The method according to claim 5, wherein the generating includes replacing real volume information included in the transfer source virtual volume information with the transfer destination real volume information based on the rule information.

7. The method according to claim 5, wherein the generating includes generating a command for establishing a virtual volume as the transfer destination virtual volume information, and the establishing includes establishing a virtual volume at the transfer destination according to execution of the command generated at the generating.

8. The method according to claim 5, further comprising:

retrieving the transfer destination virtual volume information stored in the storage unit; and sending the transfer destination virtual volume information retrieved at the retrieving.

9. A virtual volume transfer apparatus that transfers a virtual volume established on a real volume, the virtual volume transfer apparatus comprising:

a storage unit that stores therein rule information;

an acquiring unit that acquires first configuration information about virtual volume established on a real volume of a transfer source, and acquires second configuration information about real volume of a transfer destination, the transfer destination including the virtual volume transfer apparatus;

a generating unit that generates third configuration information about virtual volume for the real volume of the transfer destination from the first configuration information by reflecting the second configuration information on the first configuration information based on the rule information stored in the storage unit, wherein the rule information includes a rule applied when there is a difference between sizes of the real volume of the transfer source and the real volume of the transfer destination or a difference between the number of real volumes of the transfer source and real volumes of the transfer destination, or when a way a real volume is shared by nodes is different between the transfer source and the transfer destination; and an establishing unit that establishes a virtual volume on the real volume of the transfer destination based on the third configuration information.

10. The virtual volume transfer apparatus according to claim 9, wherein the generating unit replaces real volume information included in the transfer source virtual volume information with the transfer destination real volume information based on the rule information.

11. The virtual volume transfer apparatus according to claim 9, wherein the generating unit generates a command for establishing a virtual volume as the transfer destination virtual volume information, and the establishing unit establishes a virtual volume at the transfer destination according to execution of the command generated at the generating.

12. The virtual volume transfer apparatus according to claim 9, further comprising:

a retrieving unit that retrieves the transfer destination virtual volume information stored in the storage unit; and a sending unit that sends the transfer destination virtual volume information retrieved by the retrieving unit.

* * * * *